US006658367B2

(12) United States Patent
Conrad

(10) Patent No.: US 6,658,367 B2
(45) Date of Patent: Dec. 2, 2003

(54) SYSTEM FOR TIME-BUCKETING OF BASELINED DATA COLLECTOR DATA

(75) Inventor: Jeff Conrad, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 09/818,730

(22) Filed: Mar. 28, 2001

(65) Prior Publication Data

US 2002/0143494 A1 Oct. 3, 2002

(51) Int. Cl.[7] ................................................ G04F 1/00
(52) U.S. Cl. ...................................................... 702/176
(58) Field of Search ................................ 702/176, 188; 364/200; 371/146; 235/472; 382/240; 714/748; 395/440; 370/210, 395; 359/135; 600/510

(56) References Cited

U.S. PATENT DOCUMENTS

| | | | | |
|---|---|---|---|---|
| 4,849,879 A | * | 7/1989 | Chinnaswamy et al. | 364/200 |
| 5,796,757 A | * | 8/1998 | Czaja | 371/46 |
| 5,805,591 A | * | 9/1998 | Naboulsi et al. | 370/395.6 |
| 6,122,247 A | * | 9/2000 | Levin et al. | 370/210 |
| 6,459,928 B2 | * | 10/2002 | Mika et al. | 600/510 |
| 2002/0122228 A1 | * | 9/2002 | Rappaport et al. | 359/135 |

* cited by examiner

Primary Examiner—John Barlow
Assistant Examiner—Tung S Lau

(57) ABSTRACT

An exemplary embodiment of a system for a time-bucketing data collection module is disclosed. The time-bucketing data collection module may be configured to retrieve information from remote network devices and to collate (or sort) the retrieved information into time interval bins (or time-buckets) to assist in the maintenance of a network. The sorted information is then utilized by a threshold calculation module of the time bucketing data collection module to calculate a baseline value, defining a normal operating range for a performance parameter, for the time interval. Subsequently, the calculated baseline value is used to calculate a revised threshold value by the threshold calculation module. The revised threshold value is then forwarded to a threshold comparator configured to compare incoming information (or data point values) with the updated thresholds. If the incoming information exceeds an updated threshold, an alarm is generated by an alarm module of the time-bucketing data collection module. The time-bucketing data collection module may be further configured to perform the calculation of the baseline value and/or threshold in response to receiving an incoming information (or data point value). Alternatively, the calculations may be made on a periodic basis set by a user.

14 Claims, 7 Drawing Sheets

| TIME BUCKET 405 | START TIME 410 | END TIME 415 | START DAY 420 | END DAY 425 |
|---|---|---|---|---|
| 1 | 0000 | 0500 | 1 | 5 |
| 2 | 0501 | 1100 | 1 | 5 |
| 3 | 0000 | 2000 | 0 | 0 |
| ● | ● | ● | ● | ● |
| ● | ● | ● | ● | ● |
| ● | ● | ● | ● | ● |
| ● | ● | ● | ● | ● |
| n | | | | |

SYSTEM FOR TIME-BUCKETING OF BASELINED DATA COLLECTOR DATA

RELATED APPLICATIONS

The following application of common assignee may contain some common disclosure and may relate to the present invention:

U.S. patent application Ser. No. 09/940,614, entitled "System for Self-Monitoring of SNMP Data Collection Process".

TECHNICAL FIELD

The invention relates to a management device collecting data from remote devices over a network. More particularly, the present invention relates to improving the accuracy of analysis of data collected from the remote devices over the network.

DESCRIPTION OF THE RELATED ART

Network communications have become a fundamental part of today's computing. It is not uncommon to find two or more computer systems working together to resolve issues such as simulations, modeling, forecasting, etc. In fact, these efforts have been so successful, users have been inclined to design and implement larger and more powerful networks.

As the networks grow larger, increasingly complex, and interface with a variety of diverse networks, it is the task of a network manager (or administrator/user) to keep track of the devices on the networks, to monitor performances and load, to diagnose, and to correct problems with the network.

To assist a network manager, network management software ("NMS") may be used in the management of a network. The conventional NMS may be typically executed on a management device or node of the network. From the management node, the conventional NMS may be configured to determine a network topology, detect malfunctioning remote network devices or communication links, monitor network traffic, etc.

As part of the monitoring duties, the network manager may configure the NMS to occasionally query or poll remote network devices for information. The information may include status data, port information, address, etc. The information required may be crucial for the network manager to assess the overall status of the network.

FIG. 7 illustrates a block diagram of a conventional management node or device 700 implementing a conventional data collection from a remote node. In particular, the management node 700 includes a NMS 710 and a network interface 720. The NMS 710 may be configured to provide the functionality for a user, (e.g., a network manager), to manage a network 715 through the network interface 720.

As part of the NMS 710, the NMS 710 may include a data collector module 730 configured to retrieve user specified information at a scheduled time from remote devices 725*a* . . . 725*n* at a scheduled time over the network 715, a data collection event. The data collector module 730 may retrieve the selected information from at least one of the remote device 725*a* . . . 725*n* and store the selected information in an associated output file in the management node 700. The associated output file may be analyzed by additional network tools of the NMS 710 to assist in the assessment of the status and maintenance of the network 715.

In the analysis of the associated output file, the results of the analysis may be skewed. Typically, network systems experience regular patterns of network traffic, (i.e., data/command packets traversing a network). A typical pattern may be a high volume of network traffic during the morning hours of a work week as a result of (e.g., users checking their electronic mail in the morning), followed by a steady volume of network traffic for the rest of the day. The network traffic volume may subsequently drop during the evening hours as users end their respective work days.

However, a workday-week network traffic pattern may be markedly different than a weekend network traffic pattern where network traffic pattern may comprise of occasional network administration traffic (e.g., back-up, maintenance commands, etc.) along with an occasional weekend user. The weekend network traffic pattern may also be markedly different from a workweek overnight traffic pattern which may consist entirely of network administration traffic and/or time-intensive computations.

For example, if the results of the analysis are to be used to determine a performance threshold for incoming data, the performance threshold computation may be skewed. In typical performance threshold computation, most conventional network management systems use all the relevant collected data value points to calculate a given performance threshold. As a result, the given performance threshold may not take into account the varying network traffic patterns that may occur during a week or a given time period of the network. Accordingly, a weekend data point, which may not be aberration when compared against comparable weekend data points, is an aberration when compared against the combined data points.

The aberration may generate an alarms (or alerts) to a network manager. Since the alerts may been unnecessary, the unnecessary alerts may present an erroneous picture of the state of a network. As a result, a network manager may unnecessarily adjust performance parameters of the network to accommodate the unnecessary alarms, which may lead to an inefficient allocation of network resources. Additionally, the generation of unnecessary alarms may lead a network manager to assume that all alarms from the NMS are trivial. Thus, the network manager may ignore meaningful alarms that arrive from the NMS.

One solution to the generation of unnecessary alarms is a proposal where a sliding window of time is utilized to create the appropriate thresholds. The technique is fully described by U.S. Pat. No. 6,182,022 to Mayle et al., the subject matter of which is herein incorporated by reference.

In the Mayle technique, only collected data value points over a sliding window of time are used by a statistical analyzer to calculate a baseline for a monitored performance parameter or attribute. The baseline represents a normal operating range for the monitored performance parameter during the sliding window of time. The baseline is subsequently utilized to generate a new performance threshold. However, although the sliding window of time may take into account the varying amount of network traffic over time, the technique does not distinguish differences between network traffic patterns, which may still lead to an inaccurate picture of a network.

SUMMARY OF INVENTION

In accordance with one aspect, the present invention pertains to a method for improving accuracy of performance thresholds. The method includes configuring a plurality of time intervals and determining a received time interval of the plurality of time intervals in response to an incoming data value. The method further includes computing a revised threshold for the received time interval in response to the incoming data value and comparing the revised threshold and the incoming data value.

One aspect of the present invention is a method for improving accuracy of performance thresholds that includes allocating a plurality of memory blocks where each memory block corresponds to a time interval of a plurality of time intervals. The method also includes determining a received memory block of the plurality of memory blocks in response to an incoming data value and calculating a revised threshold for each memory block. The method further includes updating a plurality of revised thresholds for comparison against subsequent incoming data values.

Another aspect of the present invention is a system for monitoring that includes at least one processor, a memory coupled to said at least one processor, and a time-bucketing data collection module stored on said memory and executed on said at least one processor. The time-bucketing data collection module is configured to determine a received time interval of a plurality of time intervals in response to an incoming data value, to compute a revised threshold for the received time interval in response to the incoming data value, and to compare the revised threshold and the incoming data value.

Another aspect of the present invention is a method that includes establishing a plurality of time intervals and receiving one or more data values, where each data value having an associated time. The method also includes associating each of the one or more data values with one of the plurality of time intervals based on the associated time of each of the one or more data values. The method further includes calculating a parameter associated with a particular one of the time intervals as a function of those received data values associated only with the particular one of the time intervals.

Additional advantages and novel features of the invention will be set forth in part in the description which follows and in part will become apparent to those skilled in the art upon examination of the following or may be learned by practice of the invention.

DESCRIPTION OF DRAWINGS

Features and advantages of the present invention will become apparent to those skilled in the art from the following description with reference to the drawings, in which:

FIG. 4 illustrates a table of an exemplary embodiment of a scheduler module according to the principles of the present invention;

DETAILED DESCRIPTION OF PREFERRED EMBODIMENTS

Figure 1:
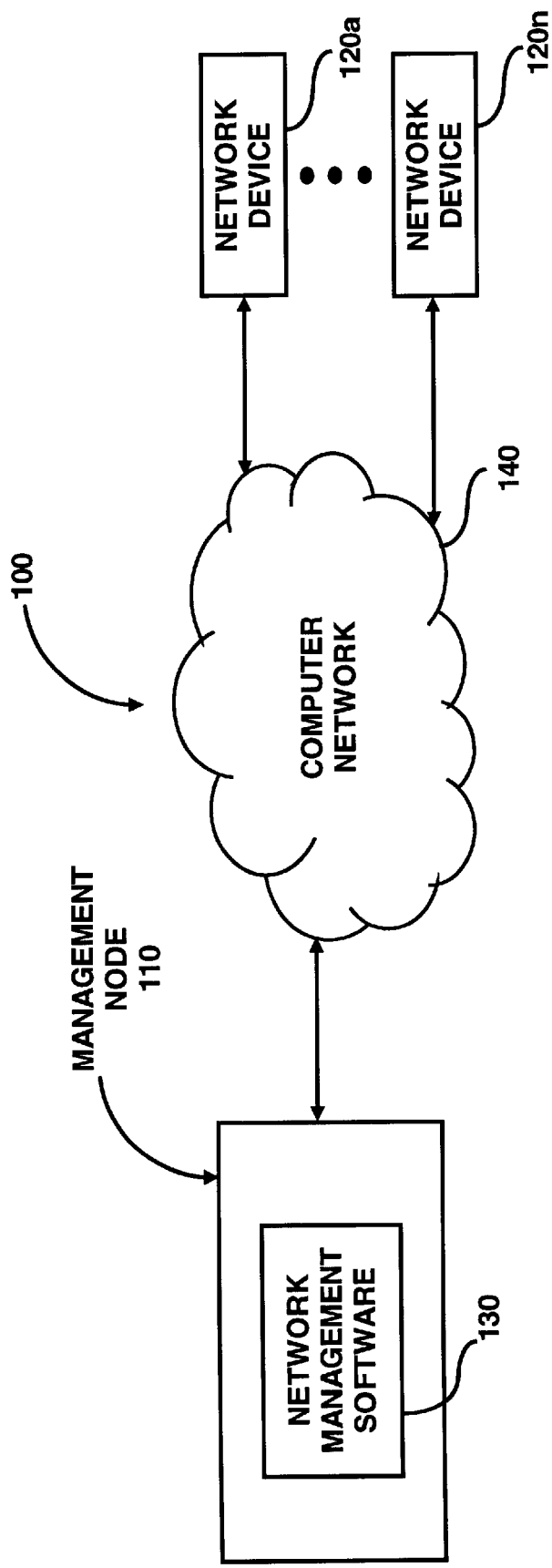
FIG. 1 illustrates a block diagram of a network where an exemplary embodiment of the present invention may be practiced.

For simplicity and illustrative purposes, the principles of the present invention are described by referring mainly to an exemplary embodiment thereof. Although the preferred embodiment of the invention may be practiced as a network monitoring system, one of ordinary skill in the art will readily recognize that the same principles are equally applicable to, and can be implemented in, any monitoring system, and that any such variation would be within such modifications that do not depart from the true spirit and scope of the present invention.

In accordance with the principles of the present invention, an exemplary embodiment of a system for time-bucketing (or time-interval sorting, time-partitioning, etc.,) of data values collected by a data collection function in a network management software ("NMS") may be utilized to improve the accuracy of analysis of collected data. The NMS may be configured to monitor and/or maintain a computer network, where a data collection module may be configured to retrieve and/or collate information from remote network devices to assist in the maintenance of the network.

The time-bucketing collection module may include a data collection module that may be configured to retrieve information from user-selected remote network devices of a network at scheduled times, a data collection event. The time-bucketing data collection module collects data point values from the monitored system and stores the data point values in a data warehouse module, which may be configured to store and/or retrieve data point values. A threshold calculation module of the time-bucketing data collection module may retrieve a recently stored data point value and may examine a time bucket module to determine which time bucket the data point value belongs. Once the appropriate time bucket is determined, the data point value may be used to calculate a baseline value for the appropriate time interval. The baseline value may then be used to calculate a new threshold for the time interval for the data point value to be compared against. The new threshold may be used to update a threshold comparator module of the time-bucketing data collection module. The threshold comparator module utilizing the new threshold values for comparison of subsequent data points values.

Although the present invention relates to time-partitioning of data for improving the accuracy of threshold calculations, it will be readily apparent to those in the art that the principles of the present invention may be applied to other calculations such as filter coefficient calculations, probability calculations, statistical analysis, and the like, without departing from the scope and/or spirit of the present invention.

Another aspect of the present invention is a time-bucket module of the time-bucketing data collection module, which may be used to configure the data warehouse into appropriate time intervals or partitions as designated by a user. The threshold calculation module may calculate a new baseline for a newly received data point value in a time interval. The baseline value may then be used to calculate a new threshold for the time interval. Subsequently, the new baseline value may be used to update the threshold comparator.

FIG. 1 illustrates a block diagram of a network 100 where an exemplary embodiment of the present invention may be practiced. In particular, the network 100 includes a management node 110 interfaced with remote network devices 120a . . . 120n and managed by a NMS 130. The management node 110 may be configured to provide network management services to the remote network devices 120a . . . 120n with a computer network 140. The management node 110 may provide the capability of monitoring, troubleshooting, and/or diagnosing of the remote network devices 120a . . . 120n and the computer network 140. The management node 110 may be implemented with a server, a workstation, a personal computer or the like.

The remote network devices 120a . . . 120n may also interface with the computer network 140. The remote network devices 120a . . . 120n may be a variety of electronic devices such as printers, scanners, servers, workstations, personal computers, and the like.

The computer network 140 may be configured to provide a communication path between the management node 110 and the remote network devices 120a . . . 120n. The computer network 140 may be implemented using network protocols such as Ethernet, token ring, X.25, simple network management protocol ("SNMP"), etc.

Figure 2:
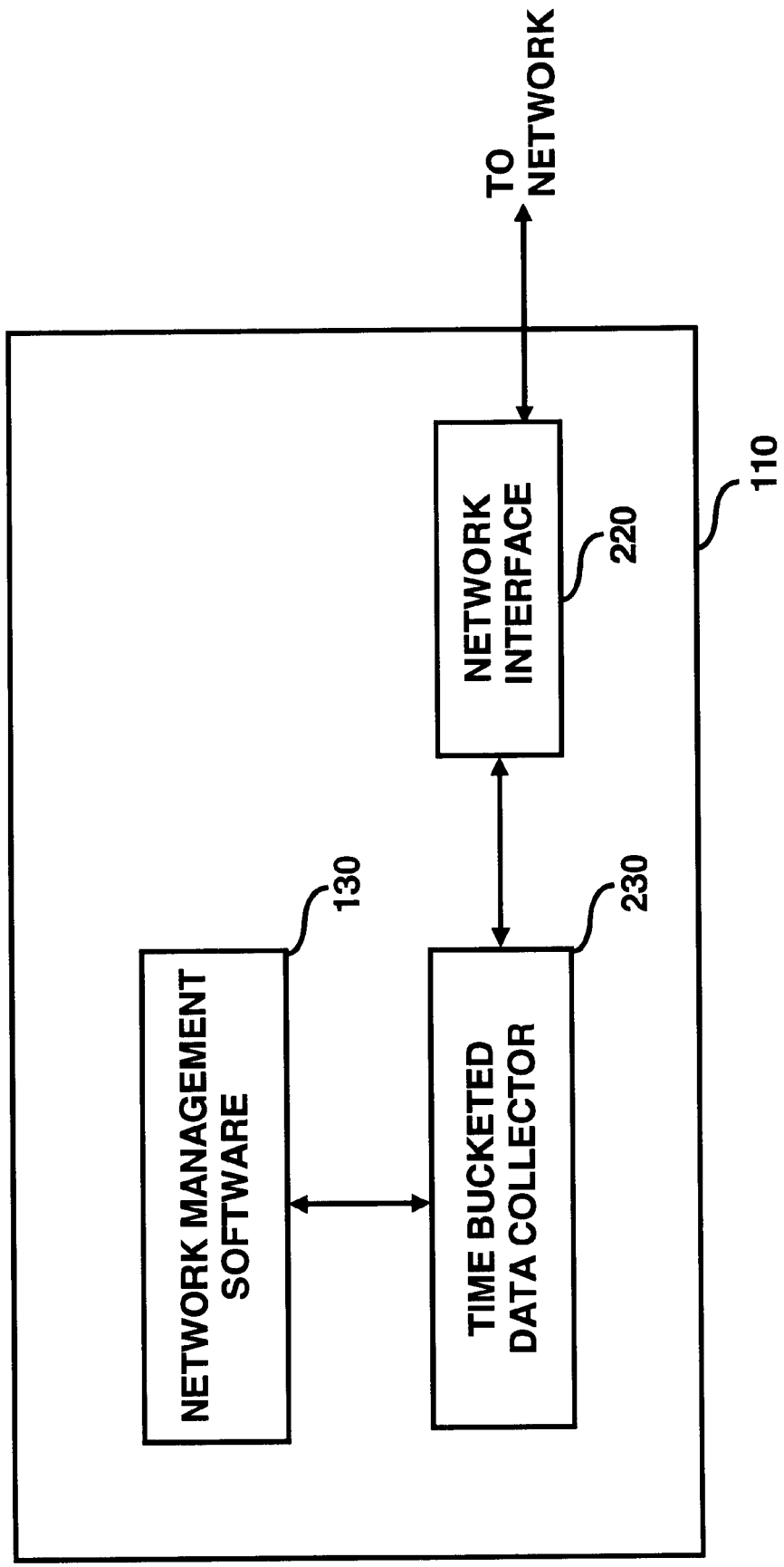
FIG. 2 illustrates a more detailed block diagram of the management node 110 utilizing an exemplary embodiment of the present invention.

FIG. 2 illustrates a more detailed block diagram of the management node 110 utilizing an exemplary embodiment of the present invention. In particular, the management node 110 includes the NMS 130. As discussed above, the management node 110 capabilities of monitoring, troubleshooting and diagnosing the computer network 130 may be implemented utilizing the NMS 130. As part of the monitoring function of the NMS 130, the NMS 130 may be configured to retrieve information from a remote device or node through a network interface 220 of the management node 110. The information may include status, transactional data, port data, address data, etc. The information may be collected and later analyzed by other network tools (or functions) to monitor and/or maintain a computer network.

The NMS 130 may implement the information retrieval from remote devices utilizing a time-bucketing data collection module 230. The time-bucketing data collection module 230 may be configured to retrieve information from remote network devices and/or to collate (or sort) the retrieved information into time interval bins (or time-buckets) to assist in the maintenance of a network. The sorted information may then be utilized by a threshold calculation module of the time bucketing data collection module to calculate a baseline value, defining a normal operating range for a performance parameter, for the time interval. Subsequently, the calculated baseline value may be used to calculate a revised threshold value by the threshold calculation module. The revised threshold value may then be forwarded to a threshold comparator configured to compare incoming information (or data point values) with the updated thresholds. If the incoming information exceeds an updated threshold, an alarm may be generated by an alarm module of the time-bucketing data collection module 230.

The time-bucketing data collection module may be further configured to perform the calculation of the baseline value and/or threshold in response to receiving an incoming information (or data point value). Alternatively, the calculations may be made on a periodic basis set by a user. Accordingly, a more accurate picture of the state of the network may be generated based on the temporal occurrences of network traffic patterns.

Figure 3:
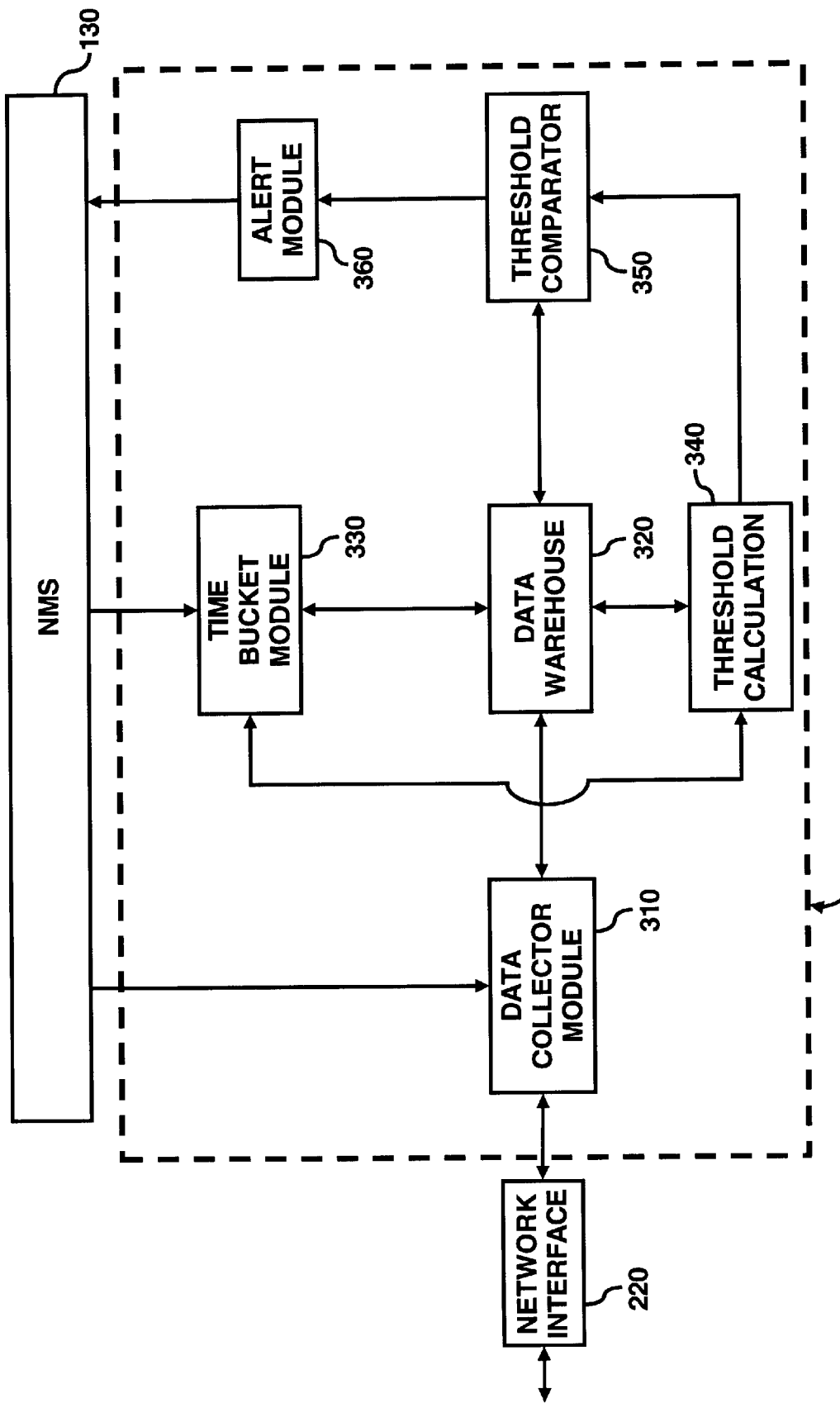
FIG. 3 illustrates a more detailed block diagram of the self-monitoring data collection module shown in FIG. 2 according to the principles of the present invention.

FIG. 3 illustrates a more detailed block diagram of the time-bucketing data collection module 230 shown in FIG. 2 according to the principles of the present invention. As shown in FIG. 3, the time-bucketing data collection module 230 may include a data collector module 310, a data warehouse 320, a time-bucket module 330, a threshold calculation module 340, a threshold comparator module 350, and an alert module 360.

The data collector module 310 of the time-bucketing data collection module 230 may be configured to retrieve user-specified information from remote network devices at scheduled intervals as described in U.S. patent application Ser. No. 09/940,614, entitled "System for Self-Monitoring of SNMP Data Collection Process" (Attorney Docket No. 10006665-1). The data collector module 310 may be configured to retrieve the user-specified information by opening up a communication channel, (e.g., a socket), for each remote network device and querying the remote network device through the network interface 220 of the management node 110.

The data warehouse 320 of the time-bucketing data collection module 230 may be configured to provide storage and/or retrieval of information retrieved from the remote network devices. The data warehouse 320 may be implemented by a memory controller (not shown) and a random access memory, flash memory, hard disk storage or the like.

Alternatively, the data warehouse 320 may be configured to store the incoming information into memory blocks, where each memory block represents a time-bucket/interval/bin. As the information is retrieved, the memory controller may reference the time bucket module 330 to determine the appropriate time-bucket for an incoming parameter value (or data point value).

The time-bucket module 330 of the time-bucketing data collection module 230 may be configured to provide a user the capability to define buckets, intervals or bins of time over a course of a week to sort the received information. A known trend in network traffic patterns is a given network traffic pattern tends to occur at similar times and similar days. Thus, by providing the capability to set up time-buckets/bins/intervals, information may be sorted or binned according to the temporal occurrence of a given network traffic pattern. The sorted information may be utilized to provide a more accurate analysis of the state of the network during the captured time because the analysis will include information of the given network traffic pattern.

FIG. 4 illustrates an exemplary embodiment of a time-bucket module 330. As shown in FIG. 4, the time-bucket module 330 may be organized in a format of a time bucket number 405, a START time 410, an END time 415, a START DAY 420, and an END day 425. In FIG. 4, the time-bucket module 330 is illustrated with the above-referenced format. However, as is readily apparent to those of ordinary skill in the art, other formats for delineating time buckets may be used in the present invention without departing from the scope and spirit of the present invention.

The time bucket number 405 is configured to provide a method to reference a particular time bucket. The START time 410 and END time 415 provide a starting time and end time, respectively, for a given time bucket. The START DAY 420 and END DAY 425 provide a method to apply a time bucket from a starting day to an end day for a time bucket. The days of the week may be represented by numerically with Sunday represented as zero to Saturday represented as a six. However, as readily apparent to those of ordinary skill in the art, other representations of time and days of the week may be used in the present invention without departing from the scope and sprite of the present invention.

Referring back to FIG. 3, the threshold calculation module 340 of the time-bucket data collection module 230 may be configured to provide a calculation of a threshold for a monitored attribute or a performance parameter of the network 100. The threshold calculation module 340 may be configured to calculate a baseline value for the performance parameter as described in U.S. Pat. No. 6,182,022. The threshold calculation module 340 may be configured to retrieve a recently received performance parameter and begin calculating a revised baseline value for the performance parameter according to the above-referenced technique.

The threshold calculation module 340 may further be configured to calculate a threshold value in response to the calculation of the revised baseline value by statistically analyzing the revised baseline number according to U.S. Pat. No. 6,182,022. From the statistical analysis, a new normal current threshold may be generated to be forwarded to the threshold comparator module 350. Alternatively, the calculation of the revised baseline value and threshold may be performed periodically, where the period may be set by a user.

The threshold comparator module 350 is at least configured to received updated thresholds for performance parameters monitored by the time-bucketing data collection module 230. The threshold comparator module 350 may further be configured to compare an incoming performance parameter and a corresponding threshold for the performance parameter. If the incoming performance parameter exceeds the threshold, the threshold comparator module 350 may notify the alert module 360.

The alert module 360 of the data collection module 230 may be configured to generate an alert message to the network management system 130 in response to a notification of a performance parameter exceeding a threshold from the threshold comparator module 350.

Figure 5:
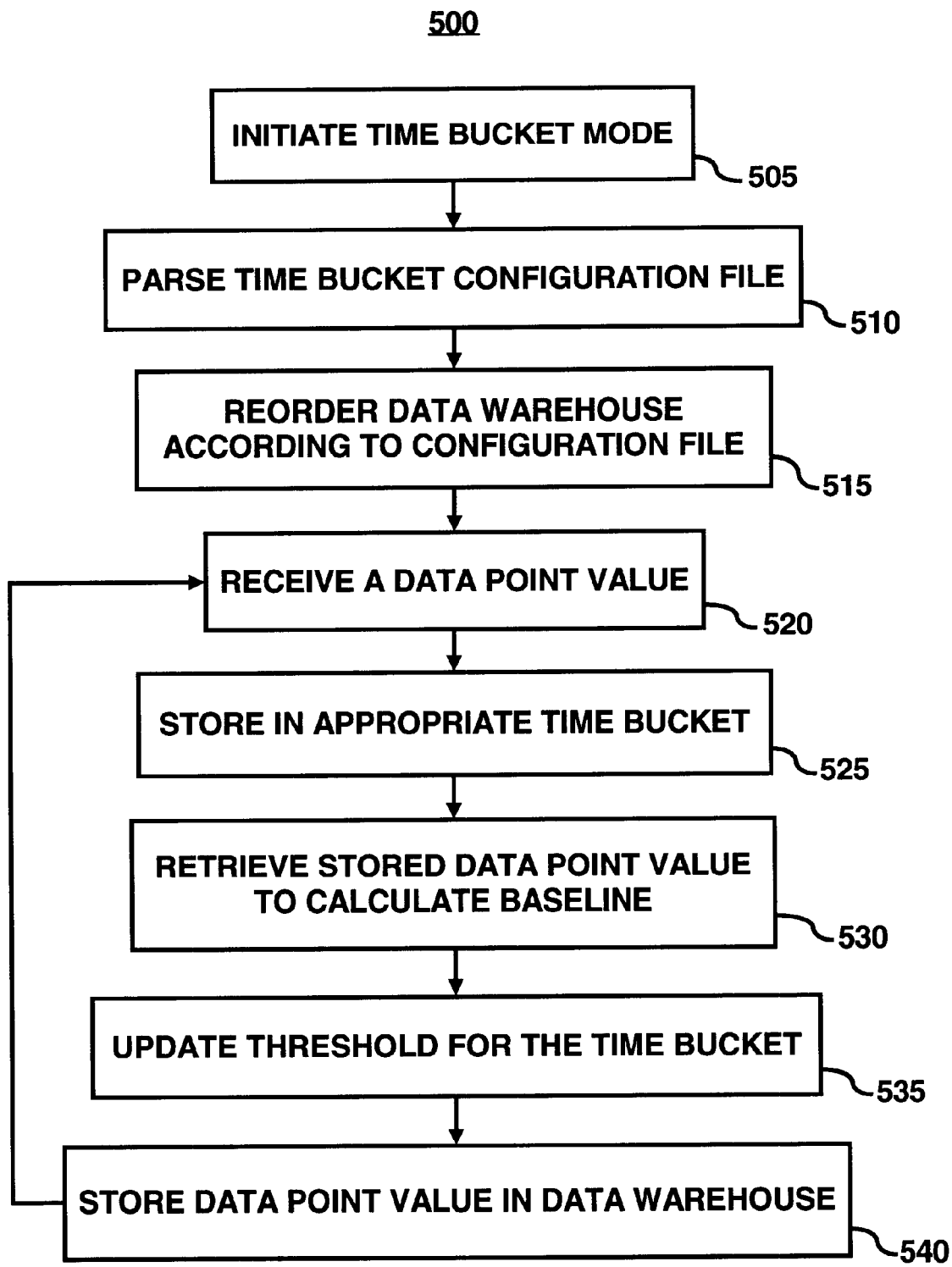
FIG. 5 illustrates a flow diagram of an exemplary embodiment of a data collector module of the self-monitoring data collector module according to the principles of the present invention.

FIG. 5 illustrates a flow diagram 500 of an exemplary embodiment of a time-bucketing data collection module 230 according to the principles of the present invention. In particular, a time-bucketing mode may be initiated by a user from a graphical user interface of the network management interface, in step 505. The user may be presented with a menu option and/or command line prompt to initiate the time-bucketing mode.

In step 510, the time-bucketing data collection module 230 may open and parse the time-bucket module 330, as describe herein above, to determine the time buckets/intervals/bins. The defined time buckets may be applied to the data warehouse 320 to create memory blocks for each time bucket defined by the time bucket file 330.

In step 515, as incoming performance parameters (or data point values) are collected by the data collector module 310, the data collector module 310 may forward the performance parameters to the data warehouse 320. The data warehouse 320 may be configured to store the incoming performance parameter in the appropriate time bucket in response to a time-stamp of the performance parameter, in step 520. Alternatively, the incoming performance parameter may be stored in the appropriate time in response to examining a system clock (not shown) of the management node 110.

In step 525, the threshold calculation module 340 may retrieve the incoming performance parameter to calculate a baseline value for the performance parameter. The baseline value may be configured to provide a normal operating range for the performance parameter. Subsequently, the threshold calculation module 340 may further be configured to calculate a new revised threshold value for the performance threshold by statistically analysis. Alternatively, the baseline and threshold calculation may be performed periodically with the period set by the user.

In step 530, the revised threshold value is forwarded to the threshold comparator 350 to update the current thresholds values. Subsequently, the threshold comparator 350 may utilize the update threshold values to compare incoming performance parameters for alarm events to be generated by the alert module 360, in step 335.

In step 540, the retrieved performance parameter may be returned to the appropriate memory block in the data warehouse 320.

Figure 6:
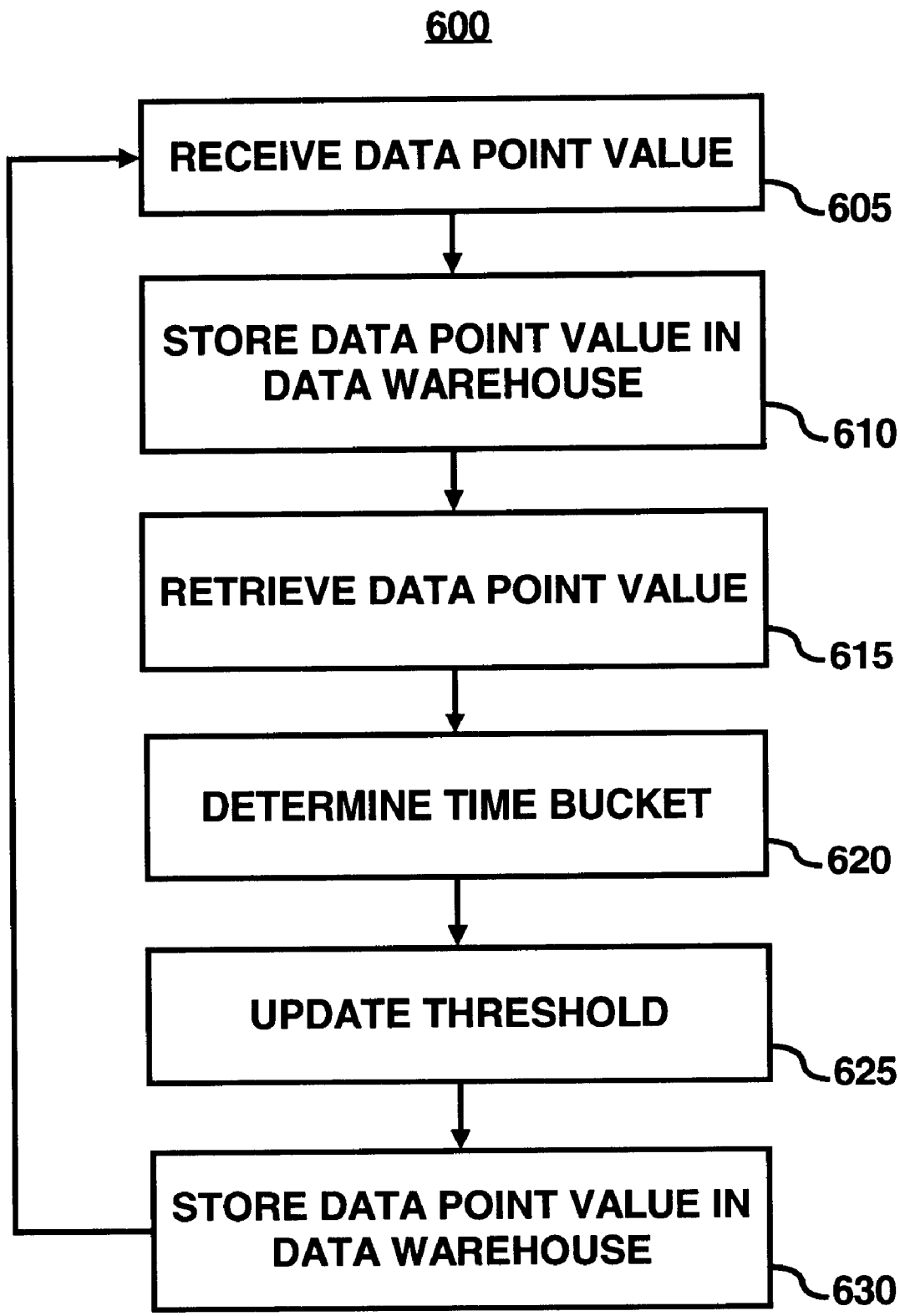
FIG. 6 illustrates a flow diagram of an exemplary embodiment of a monitor module of the self-monitoring data collector module according to the principles of the present invention.
Figure 7:
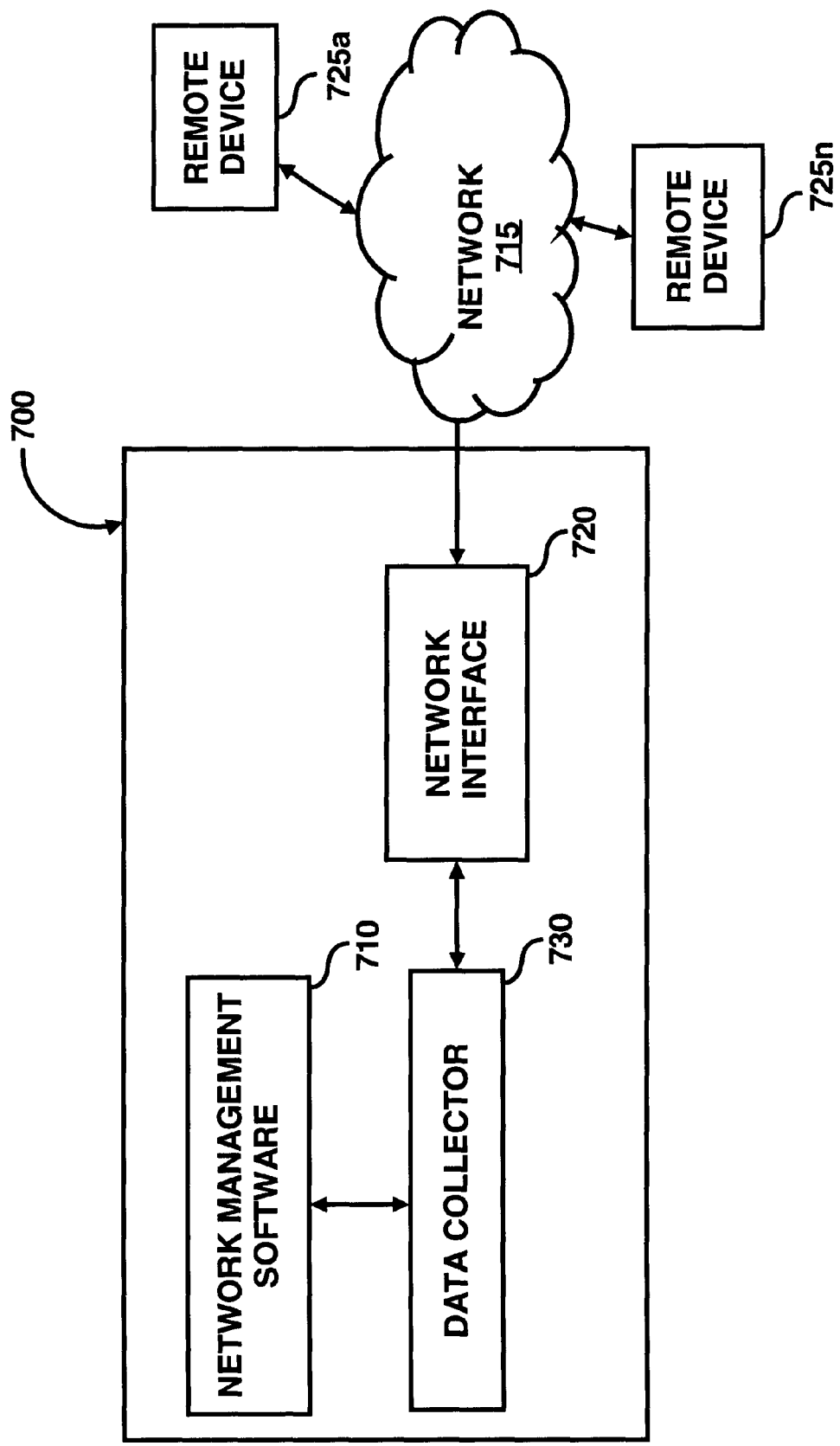
FIG. 7 illustrates a block diagram of a conventional management node or device implementing a conventional data collection from a remote node.

FIG. 6 illustrates a flow diagram 600 of another embodiment of a time-bucketing data collection module 230 according to the principles of the present invention. In particular, the data collector module 310 may receive a performance parameter (or data point value) from a monitored system, in step 605. The received performance parameter may be stored in the data warehouse 320, in step 610. The received performance parameter may be retrieved by the threshold calculation module 340, in step 615.

In step 620, the threshold calculation module 340 may be configured to examine the time-bucket module 330 to determine the appropriate time-bucket/bin/interval for the retrieved performance parameters. In step 625, the threshold calculation module 340 may further be configured to calculate a newly revised baseline value for the performance parameter. The newly revised baseline value is configured to provide a normal operating range for the performance parameter. Subsequently, the threshold calculation module 340 may further be configured to calculate a newly revised threshold value for the performance threshold by statistically analysis.

In step 630, the revised threshold value may be forwarded to the threshold comparator 350 to update the current thresholds values and the time-bucketing data collection module 230 returns to step 605. Subsequently, the threshold comparator 350 may utilize the update threshold values to compare incoming performance parameters for alarm events to be generated by the alert module 360.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for improving performance thresholds comprising:
   configuring a plurality of bins each representing a time interval over a week time span;
   selecting a bin of said plurality of bins based on an incoming data value;
   storing said incoming data value in said selected bin;
   computing a revised threshold for said selected bin;
   comparing said revised threshold and said incoming data value;
   calculating, in response to said incoming data value, a revised baseline defining an operating range for said selected bin; and
   calculating a revised baseline configured to provide an operating range for said bin in response to said incoming data value.

2. The method for improving performance thresholds according to claim 1, further comprising:

generating an alarm in response to said incoming data value exceeds said revised threshold.

3. The method for improving accuracy of performance thresholds according to claim 1, further comprising:

allocating a plurality of memory blocks, each memory block corresponding to each bin of said plurality of bins.

4. The method for improving accuracy of performance thresholds according to claim 3, further comprising:

applying said plurality of bins to a data warehouse configured to store said plurality of memory blocks.

5. The method for improving accuracy of performance thresholds according to claim 1, further comprising:

generating an alert in response to said incoming data value said revised threshold.

6. The method for improving accuracy of performance thresholds according to claim 3, further comprising:

calculating periodically a plurality of revised baseline values, each revised baseline value configured to provide an operating range; and updating each revised threshold of said plurality of revised thresholds with a corresponding revised base value of said plurality of revised baseline values.

7. A system for improving accuracy of performance threshold comprising:

at least one processor;

a memory coupled to said at least one processor; and a time-bucketing data collection module stored on said memory and executed on said at least one processor, wherein said time-bucketing data collection module is configured to determine a bin of a plurality of bins in response to an incoming data value, to store said incoming data value is said bin, to compute a revised threshold for said bin, and to compare said revised threshold and said incoming data value, wherein said time bucketing data collection module is further configured to calculate a revised baseline configured to provide an operating range for said bin in response to said incoming data value, and to determine said revised baseline in response to said incoming data value, wherein said revised baseline is statistically analyzed to determine said new threshold.

8. The system for improving accuracy of performance thresholds according to claim 7, wherein said parameter file defines a plurality of bins over a week time span.

9. The system for improving accuracy of performance thresholds according to claim 7, wherein said time bucketing data collection module is further configured to generate an alarm in response to said incoming data value exceeds said revised threshold.

10. A method comprising:

establishing a plurality of bins;

receiving one or more data values, each data value having an associated time;

storing each of said one or more data values in one of said plurality of bins based on said associated time of each of said one or more data value; and calculating a parameter associated with a particular one of said bins as a function of those received data values associated only with said particular one of said bins, wherein said parameter is one of a group consisting of a threshold and a filter coefficient.

11. The method according to claim 10, wherein in said data values relate to a computer network.

12. A system for improving accuracy of performance threshold comprising:

at least one processor;

a memory coupled to said at least one processor;

a time-bucketing data collection module stored on said memory and executed on said at least one processor, wherein said time-bucketing data collection module is configured to determine a bin of a plurality of bins in response to an incoming data value, to store said incoming data value is said bin, to compute a revised threshold for said bin, and to compare said revised threshold and said incoming data value, wherein said time bucketing data collection module is further configured to store said incoming data value and to apply a parameter file configured to specify said plurality of time intervals to said incoming data value to determine said received time interval of said plurality of time intervals, wherein said parameter file defines a plurality of bins over a week time span.

13. The system for improving accuracy of performance thresholds according to claim 12, wherein said time bucketing data collection module is further configured to calculate a revised baseline configured to provide an operating range for said bin in response to said incoming data value and to determine said revised baseline in response to said incoming data value, wherein said revised baseline is statistically analyzed to determine said new threshold.

14. The system for improving accuracy of performance thresholds according to claim 12, wherein said time bucketing data collection module is further configured to generate an alarm in response to said incoming data value exceeds said revised threshold.

* * * * *